W. F. FOLMER.
CAMERA.
APPLICATION FILED JAN. 23, 1908.
932,457.
Patented Aug. 31, 1909.
5 SHEETS—SHEET 5.
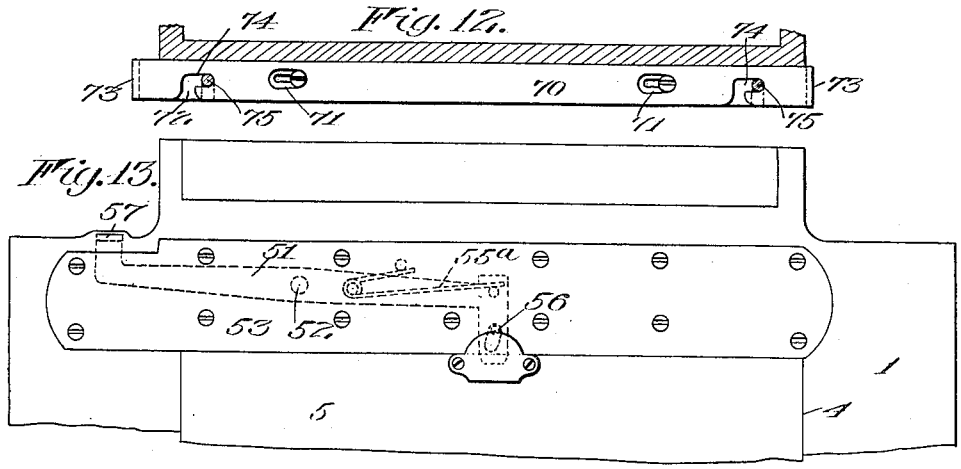
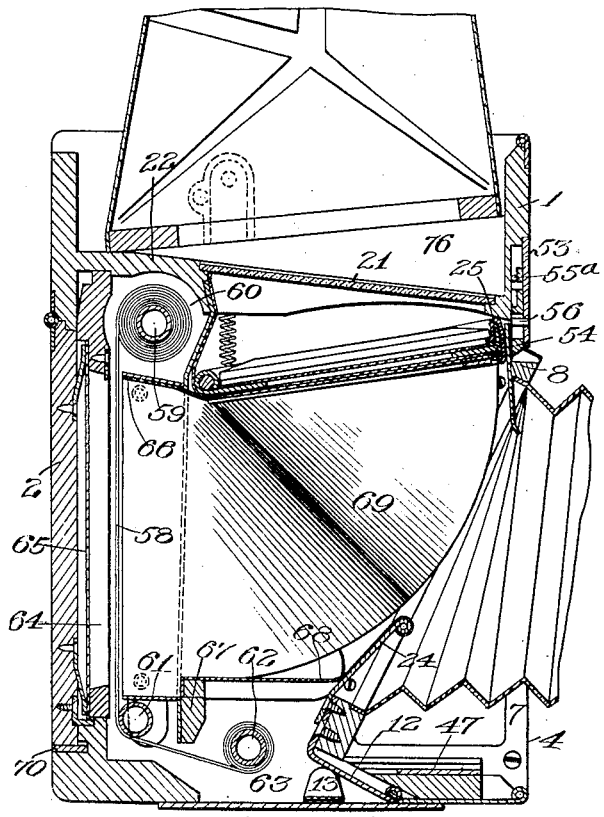
Witnesses
Walter B. Payne
Russell B. Griffith
Inventor
William F. Folmer
By Church & Rich
his Attorneys

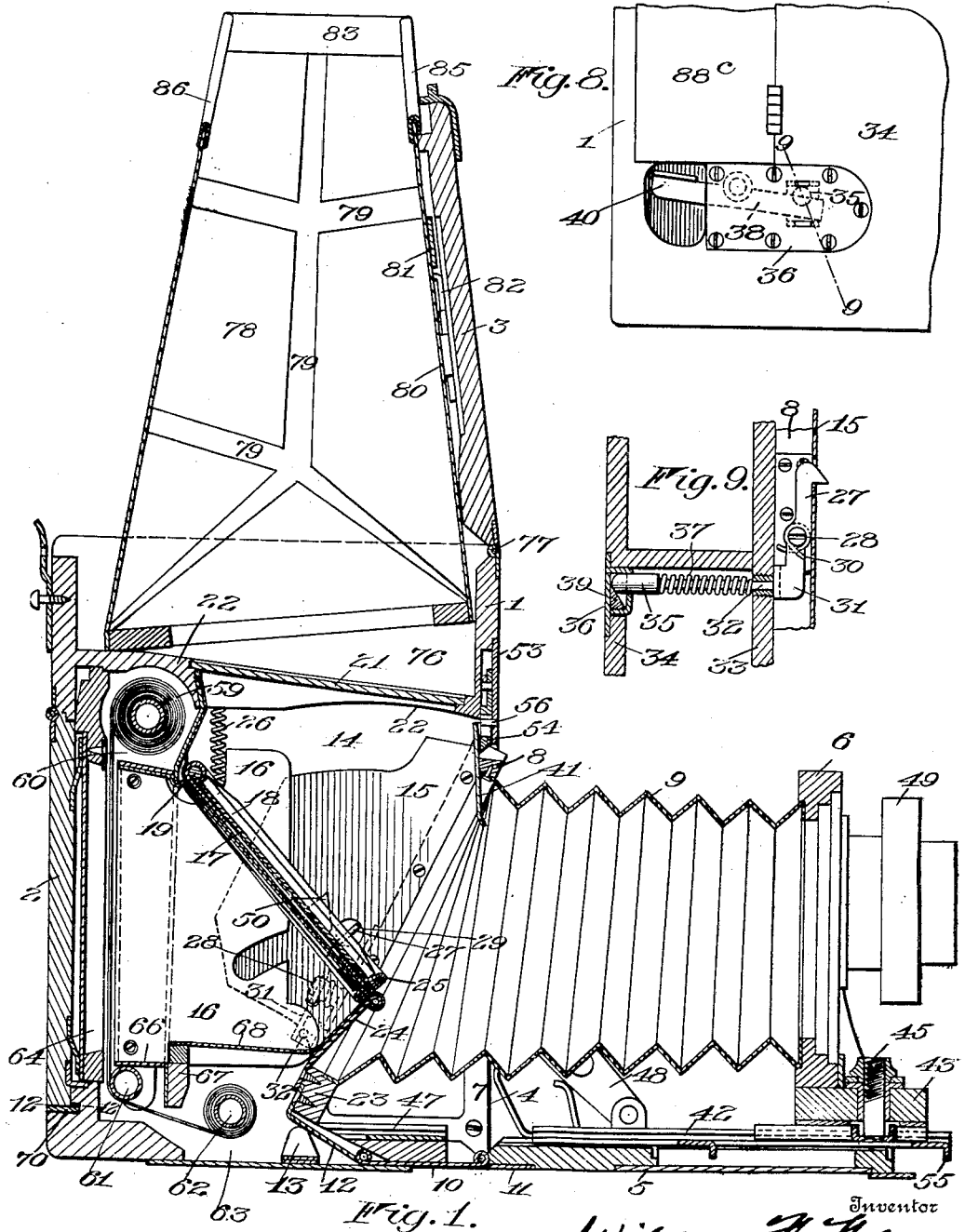

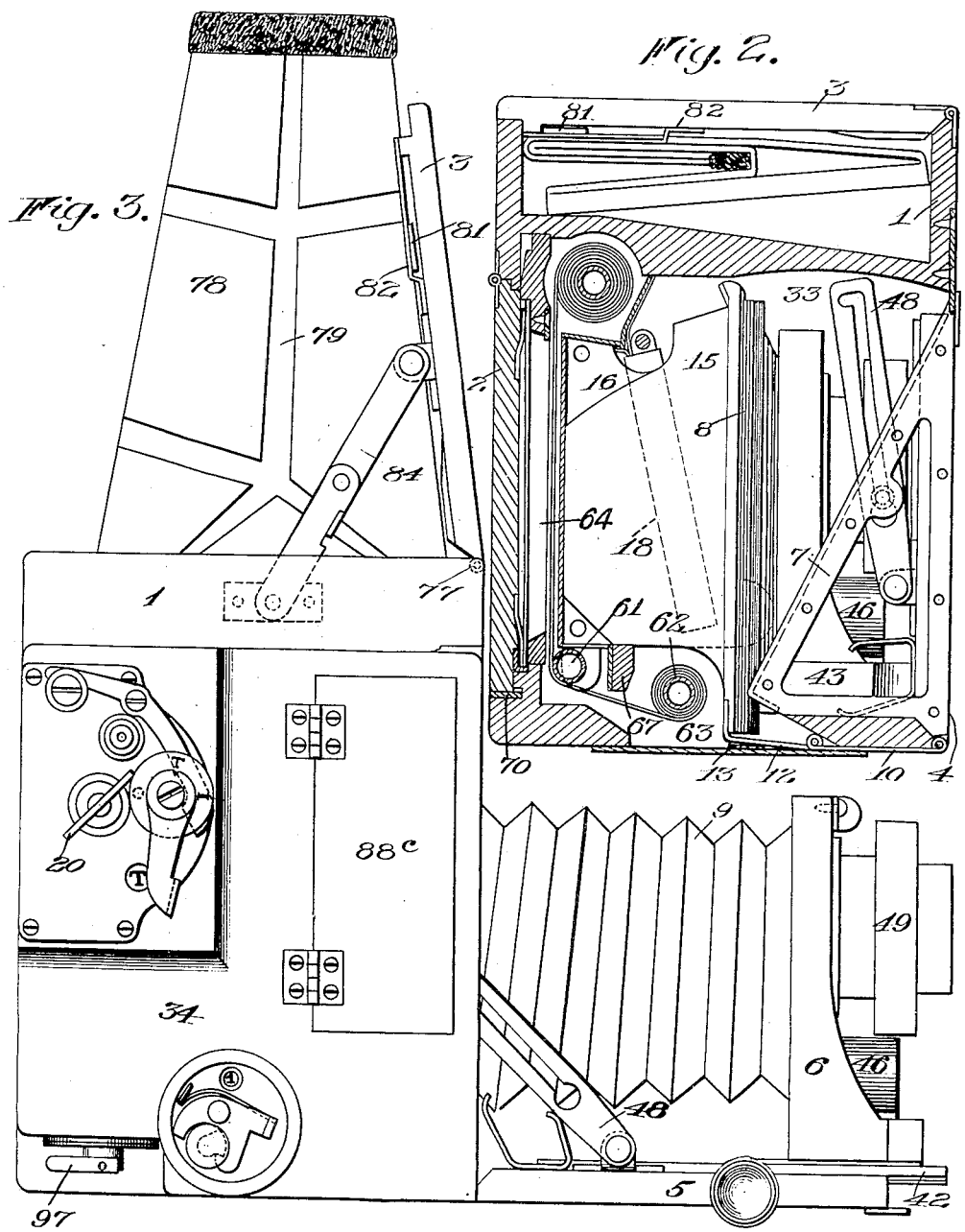

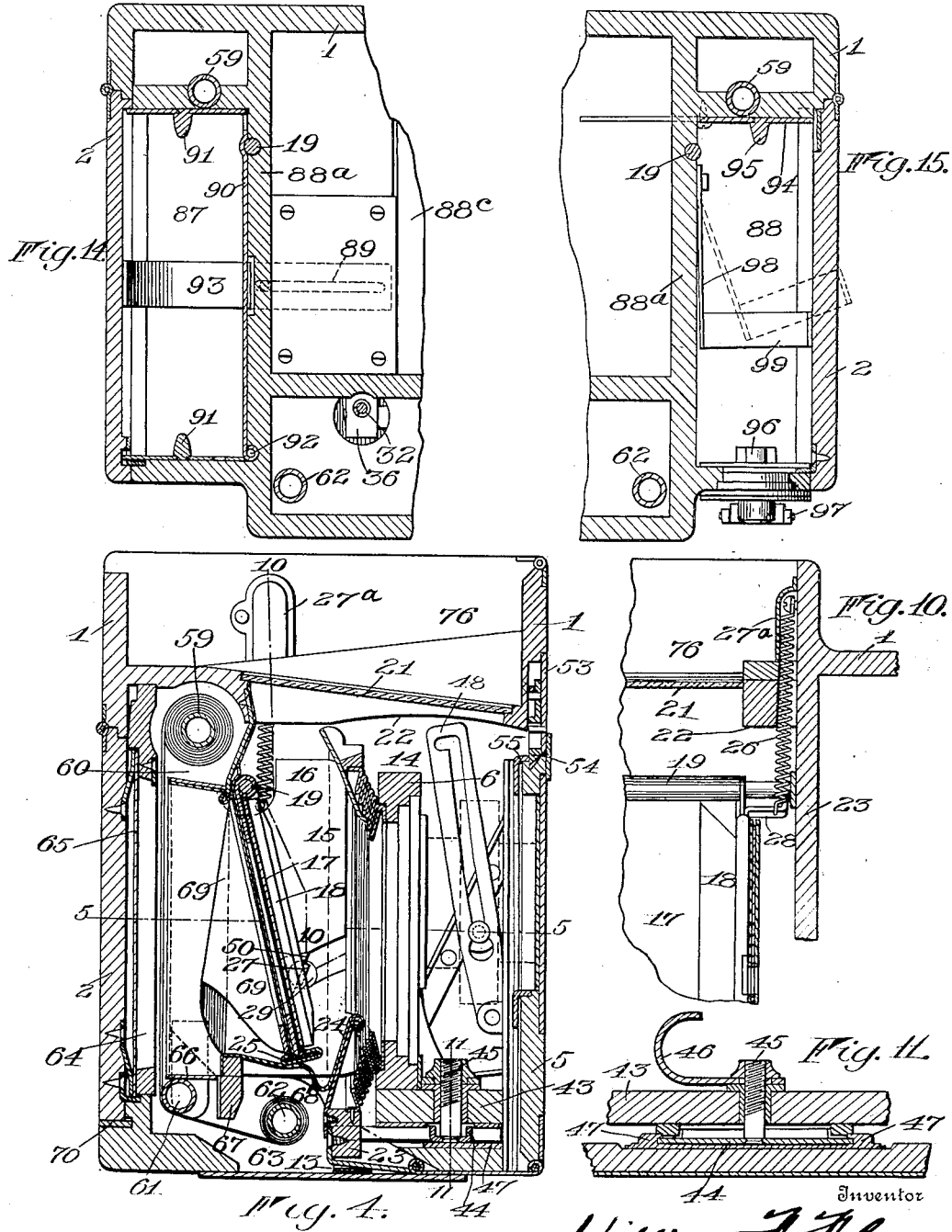

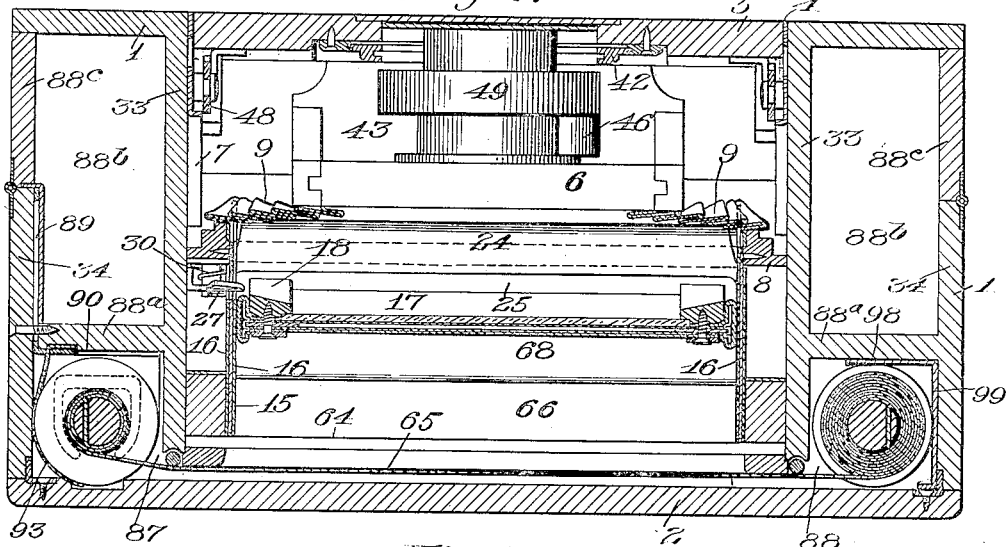
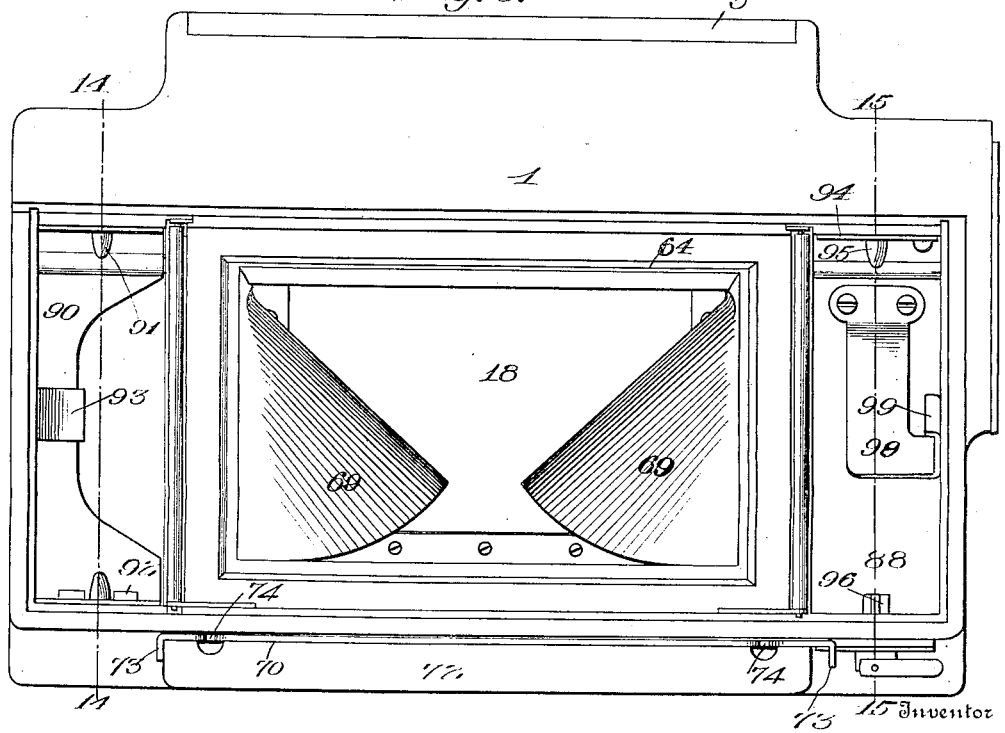

UNITED STATES PATENT OFFICE.

WILLIAM F. FOLMER, OF ROCHESTER, NEW YORK, ASSIGNOR TO EASTMAN KODAK CO., OF ROCHESTER, NEW YORK, A CORPORATION OF NEW YORK.

CAMERA.

932,457.

Specification of Letters Patent.     Patented Aug. 31, 1909.

Application filed January 28, 1908. Serial No. 412,264.

*To all whom it may concern:*

Be it known that I, WILLIAM F. FOLMER, of Rochester, county of Monroe, and State of New York, have invented certain new and useful Improvements in Cameras; and I do hereby declare the following to be a full, clear, and exact description of the same, reference being had to the accompanying drawings, forming a part of this specification, and to the reference-numerals marked thereon.

My present invention relates particularly to photographic cameras and it has for one of its objects to provide a simple and serviceable camera of a reflecting or similar type so constructed and arranged as to be readily disposed when folded within a body or casing of comparatively small size, rendering the instrument as a whole light and compact without detracting in any way from its efficiency in actual operation.

My improvements are further directed toward other general and particular features of camera construction designed to promote simplicity of manufacture, efficiency and convenience in operation and to enlarge the field of utility.

To these and other ends the invention consists in certain improvements and combinations of parts all as will be hereinafter more fully described, the novel features being pointed out in the claims at the end of the specification.

In the drawings: Figure 1 is a central, longitudinal vertical section through a camera, constructed in accordance with my invention and illustrating one embodiment thereof, the parts being extended for use and the flap constituting the focusing mirror being in operative position. Fig. 2 is a vertical section taken in the plane of the inner face of one of the side walls of the camera body or box with all the parts in folded position. Fig. 3 is a side elevation with the parts arranged as in Fig. 1. Fig. 4 is a view similar to Fig. 2 with the exception that the plane of the section is taken centrally of the camera. Fig. 5 is a horizontal section on the line 5—5 of Fig. 4. Fig. 6 is a rear elevation with the parts in the position shown in Fig. 5, the camera back being removed. Fig. 7 is a view similar to Fig. 1, but with the flap or mirror in inoperative position and the camera ready for exposure. Fig. 8 is a detail elevation of the portion of the exterior of the camera, showing the operating lever for the mirror or flap mechanism. Fig. 9 is a transverse vertical section of the same on line 9—9 of Fig. 8, showing the latch and its actuating member. Fig. 10 is a vertical section on the line 10—10 of Fig. 4 being a detail of the tension devices for the flap or mirror. Fig. 11 is a vertical transverse section through the carriage and bed on the line 11—11 of Fig. 4 showing the clamping mechanism thereof. Fig. 12 is a horizontal section on the line 12—12 of Fig. 1 being a detail of the locking mechanism of the camera back. Fig. 13 is a fragmentary front view of the camera showing the locking mechanism between the bed and casing. Fig. 14 is a vertical section through one of the film chambers on the line 14—14 of Fig. 6. Fig. 15 is a similar view through the other film chamber on the line 15—15 of the same figure.

In carrying out my invention I provide in general, in the present instance, a camera box or casing having a forward opening adapted to be closed by the hinged bed and within which fits a yielding frame mounted within the casing and connected by a bellows to the camera front, the said frame being adapted to move inwardly when the front is retracted, so that the latter may be accommodated within the casing. The said frame carries a seat for the focusing mirror or flap movably mounted within the camera and moves the said mirror or flap to the rear of the camera when the frame is displaced by the front. The securing devices for the mirror are also carried by the frame. The collapsible focusing hood arranged at the top of the casing lies, when folded, beneath the cover and is provided with a collapsible eyepiece having several advantages, one of which is that it is foldable against the under side of the cover though automatically expanded by the opening movement of the latter.

One of the film chambers is provided with a tension member for the roll, held in operative position by the engagement of the camera back, while the other includes an ejector for the roll which also operates to eject the back when its locking devices are released, the film supports of both chambers being incorporated in removable clips for purposes of convenience.

Referring now to the drawings, and particularly to Fig. 1 thereof, for a more detailed description of these and other parts and of their operation and advantages, 1 indicates a box or casing having a preferably hinged back 2, top 3 and a forward opening 4 closed by a door 5 which also forms a bed for the adjustable camera front 6, as is usual. I prefer to provide the body with the inner walls 33 for purposes that will later appear. Mounted on the bed is a track or way 42, upon which travels a carriage 43 which is clamped thereto in any desired position of adjustment, by means of a clamping device comprising, in the present instance, a plate 44 provided with a bolt 45 extending through the carriage and having threaded on its upper projecting end a finger piece 46, preferably in the form of a hook to assist in manipulating the carriage upon the bed. A track section 47 is provided at a forward point on the bottom of the camera casing with which the track 42 is held in alinement when the door 5 is extended by the usual links 48, extending between the bed and body.

Within the casing and at the sides of the opening 4 are provided inclined seats or supports formed in the present instance by triangular bracket plates 7 secured to the side walls 33, with which coöperates the edges of a yielding frame or member 8 pivoted at its lower end and connected to the camera front or lens board by a collapsible bellows 9. For convenience in mounting this frame and the door 5, I provide a double leaf hinge 10 in the bottom of the casing beneath the track 47, one leaf 11 of which is secured to the door, while the other leaf 12 is secured to the lower edge of the frame forming in effect a forward extension on the latter, so that when the frame is moved inwardly, against the tension of a spring 13 arranged between it and the bottom of the casing to normally hold it in its seat, it assumes a substantially vertical position (Fig. 2) considerably in rear of the front of the casing and of the track 47 or well within the chamber 14 thereof.

To prevent the entrance of light into the camera during the movements of the frame, the latter is provided on each of its lateral sides with a blade 15 which extends within a pair of double walls 16 at either side of the camera.

The focusing devices include a mirror 17 mounted in a frame 18 carried by a shaft 19 extending transversely of the casing and journaled in its walls. The shaft is rotated by means of a key or thumb-piece 20 arranged exteriorly of the casing (Fig. 3) to swing the mirror to its operative position, as shown in Fig. 1 where it is retained by devices hereinafter described, the image being reflected and temporarily recorded upon a ground glass or other focusing screen 21 supported within the partition member 22 at the top of the camera, the latter providing a seat for the mirror when in the inoperative position, that is, during exposure (Fig. 7). Projecting a short distance within the frame 8 and secured to the lower rail 23 thereof is a yielding plate or member 24, which extends tangentially to the path of movement of the outer edge of the mirror frame and is engaged thereby when the mirror is in its normal position to insure a light tight relation of the parts, the mirror frame itself being preferably bound as at 25 with a yielding material such as plush or felt. The mirror frame is secured in this position against the tension of the spring 26 (Fig. 10) by the spring latch 27 (Figs. 1 and 9) carried on the frame 8. The spring 26 is arranged in a housing 27$^a$ within the casing and connected to a member 28 extending between the mirror frame and rock shaft 19 at a point eccentric to the latter.

The latch 27, journaled upon a stud 28 on the frame 8, operates through an aperture 29 on the blade 15 within which it is normally held by spring 30, while its opposite end 31 is disposed in alinement with an actuating member 32 mounted within and extending between the inner and outer walls 33 and 34 of the casing. This actuating member comprises in the present instance a plunger having a rounded end or head 35 extending within the housing 36 in the outer wall of the body, and normally held out of engagement with the latch by a spring 37. Also arranged to operate within the housing, but extending at right angles to the actuating member is an operating member comprising in the present instance a lever 38, one end of which is provided with a cam 39, while the other end 40 extends without the housing, and is accessible from the exterior of the camera. It will be seen that when the frame 8 is against its seat the lower end 31 of the latch will always be opposite the actuating member and the latch can be released by operating the lever 38 and moving the plunger inwardly through the engagement of the cam 39 with the headed portion 35 thereof. The mirror, after its release, flies upwardly through the action of the spring 26 and seats against the partition member 22, the binding on the forward edge of the frame traveling in brushing contact with a plate 41, secured to the top of the frame, which engages the front wall of the casing adjacent the exposure opening. This contact seals the exposure chamber against rays of light entering through the focusing screen. It will be noted that the proximity of the frame 8 in no way interferes with the movements of the mirror, as the latter is so proportioned relatively thereto as to be readily accommodated between its sides through part of its travel.

The parts being in the extended position shown in Fig. 1 and the mirror being set or in operative position, when it is desired to fold or close the camera, the carriage 43 is moved inwardly from the track 42 to the track 47 at which point the front 6 engages with the upper portion of the frame 8 and moves the latter from its seat to its vertical position, against the tension of the spring 13, so that the front 6 occupies a position between the frame 8 and the front wall of the casing, and permits the door 5 to close the opening 4 (Fig. 4), the folds of the bellows 9 being assembled against a depending portion of the plate 41 and thereby prevented from projecting in a reverse direction through the frame 8. I prefer to provide sufficient space between the front wall and the frame to accommodate the front and also the lens tube 49 carried thereby, so that the latter and any corollary mechanism will not have to be first removed.

During the rearward movement of the frame 8 the latch 27 carried thereby engages with an abutment in the form of a plate 50 on the mirror frame, and moves the latter against the tension of the spring 26 to an inoperative and substantially vertical position at the rear of the exposure chamber and against the rear wall of the camera, as shown in Fig. 4, rather than to a position at the top of the chamber against the focusing screen, as is usually done, so that when the front is again extended and the frame 8 resumes its seat within the opening the mirror will fly back to its operative position against the plate 24 and be arrested by the latch 27, preventing accidental or inadvertent exposure of the film until voluntarily operated otherwise.

The securing latch for the door 5 shown in detail in Fig. 13, comprises in the present instance a lever 51 pivoted at 52 to a plate 53 secured to the camera body, one end being extended at right angles to form a catch 54 which engages behind the keeper 55 on the door (Fig. 4) and beveled at its edge, as shown for automatic engagement through tension of the spring 55ª, a pin 56 operating through a slot therein acting as a guide. The operating end of the lever 57 may be extended to any convenient point on the casing and concealed beneath leather or other covering material, as is usual.

In the present embodiment of my invention, I provide a camera fitted with a shutter of the focal plane type and comprising a curtain 58 operating from the winding roller 59, arranged in the chamber 60 above the exposure chamber 14 and over the guide roller 61 to a tension or feed roller 62 arranged in a chamber 63 below the exposure chamber, the said curtain controlling the shutter or exposure opening 64 in the rearward wall of the camera across which film 65 is fed or a plate held in any well known manner, the films being in the present instance confined between the back 2 and the rear wall of the casing in which is the exposure aperture 64 forming, in the present instance, a support for these sensitized devices that receive the impressions of the images and constitute the permanent photographic records thereof after exposure.

In front of the shutter opening 64 and at the rear of the exposure chamber is fitted a frame 66 beneath the roller chamber 60 and supported in part upon a transversely extending rail 67. To render the camera light tight at all times, both from rays seeking entrance through the focusing screen 21 and around the frame 8, I provide a flexible shield 68 on the lower portion of the latter extending over the roller chamber 63 and secured at its opposite end to the frame 66, while similar shields 69 (removed in Fig. 1) extend between the lateral edges of the mirror frame 18 and the said frame 66.

It will be seen from the foregoing that the camera embodies, irrespective of its casing an exposure chamber comprised between walls formed by the members 15 and 16 the shield 68 and the support for the recording devices at the rear while the frame 8 to which the front is connected is movable toward and from the said support and forms an opening at the top controlled by the mirror or flap mounted to swing within the chamber into substantial coöperation with both the support and opening. It will also be noted that this mirror or flap controls the passage of light admitted through the frame directing it to either the sensitized material in the support or the focusing screen or ground glass above the opening in the exposure chamber.

Devices which I prefer to employ for securing the back 2 in its closed position are best illustrated in Fig. 6 and in detail in Fig. 12; they comprise a bar 70 movable longitudinally in guides 71 on a rearward extension 72 of the camera bottom, the ends of said bar being turned angularly or otherwise provided with finger pieces 73 which project beyond the edges of the extension. At points intermediate its ends, the bar is provided with L-shaped slots 74 within which engage pins or projections 75 on the back 2, the said projections being locked therein by a longitudinal movement of the bar as shown in Fig. 12. The devices for projecting the back when released will be later described.

The focusing apparatus is best shown in Figs. 1 and 3. The partition member 22 and a focusing screen 21 form the bottom of a chamber 76 at the top of the casing which is closed by a cover 3, preferably hinged at 77 and before referred to. Secured at its lower end within this chamber 76 is a collapsible focusing hood 78 which is foldable longitudinally and transversely along the lines or creases 79, the intermediate portions being preferably stiffened or reinforced. One side thereof, 80, may be made relatively stiff to extend against and substantially coincide with the under face of the cover 3, and is movably attached thereto through the medium of a transversely extending bar 81 operating in guiding brackets 82 upon the cover. At its upper end the hood is provided integrally with an eyepiece 83, which is cut away or otherwise designed to conform substantially to the features of the operator, being preferably bound at its edges with soft material such as pile fabric offering both a pleasant contact and excluding from the interior of the hood rays of light, which might otherwise enter and detract from a clear inspection of the image. When the hood is in operative position the eyepiece projects beyond the upper edge of the raised cover 3 in the direction of general extent of the latter, one of the creases 79 being arranged just below its conjunction therewith, so that the eyepiece may be folded against the under side of the cover as the latter is lowered and the hood as a whole collapsed to occupy the position best shown in Fig. 2, within the chamber 76. When the cover is raised the material of the hood being sufficiently stiff for the purpose, the latter automatically expands to an operative form and is held in such position with the usual links 84 connecting the cover and casing. As the configuration of the eyepiece 83 includes a cut-away portion 85 for the brow and 86 for the nose of the operator, one advantage of this collapsible construction is that the eyepiece will yield inwardly under slight pressure, and absolutely adapt itself within the hollows of the eyes and to the contour of the features generally.

The manner in which I accommodate the film spools or rolls, when used is best illustrated in Figs. 5, 6, 14 and 15, the present structure comprising generally the feed chamber 87 and winding chamber 88 arranged upon opposite sides of the shutter opening 64, and included between the inner and outer walls of the casing and partition members 88ª. This forms corresponding storage chamber 88ᵇ for the reception of rolls of exposed or unused film and accessible through doors 88ᶜ on the exterior wall of the casing. Guided within the feed chamber 87 by means of a slotted extension 89 through which projects a pin on the camera casing, is a clip 90 provided with spool supports 91 at opposite ends, one of which may be hinged as at 92 to aid in disengaging the spool when the clip is drawn out to project from the chamber. Attached to the clip is an outwardly projecting tension member 93 preferably in the form of a leaf spring or finger which forms a convenient handle for the operator in withdrawing the clip, and is also pressed against the periphery of a roll of film arranged in the support to exert a yielding tension thereon by the engagement of the camera back 2, when in closed position, as shown in Fig. 14. The opposite or winding chamber 88 is fitted with a similarly guided sliding plate or clip 94 carrying a spool support 95 arranged opposite a support 96 formed by the inner end of the usual winding key 97 projected inwardly to its normal position of engagement by spring pressure and retracted by outward movement, in the well known manner. Preferably on the rear wall of the chamber is an ejector embodying in the present instance a leaf spring 98 adapted to engage with the spool or roll and having a forward extension 99 thereon which, when engaged by the back 2 in the latter's closed position, holds the ejector 98 out of engagement with the roll and under tension. It will thus be seen that the latter while acting as a spring for projecting the back 2 after its securing devices are released, subsequently moves to engagement with the spool or roll on the supports 95 and 96, as shown in dotted lines Fig. 15 and serves to eject the film from the chamber as soon as the support 96 is retracted by manipulation of the key 97, the clip 94 moving with the roll and being easily withdrawn when thus started. It will be observed that the tension device 93 in the feed chamber 87 being in engagement with the back 2 when the latter is closed also operates to project the back, although it is preferably made light in strength in order that its pressure against the film be slight, though sufficient to prevent the roll from overfeeding.

The construction embodying the holder or support for the recording devices at the rear, and the bellows and connected parts, form a camera irrespective of the outer containing casing, and the pivoted frame also carrying in the present instance, the mirror constitutes, when in its raised position, a closure for the top of the exposing chamber of the camera. As the flap or mirror is movable into a plane approximately parallel with that of the sensitized surface or camera back, the camera can be folded into small compass to be readily contained within a comparatively shallow casing, while the feature of providing this hinged member between the sensitized material and the lens, when used in connection with the focusing screen above the mirror, produces a focusing camera, the mirror or hinged member serving when in its upper position to completely protect the film during exposure, by closing the opening through which the rays pass during the focusing operation.

In the form of the invention shown, the hinged flap or mirror coöperates with the blind shutter, as shown and described in my prior patent No. 716,021, granted December 16th, 1902, but it will be understood, that it could if desired, be used separately as an exposing shutter, and without the addition of a blind shutter, or one in a lens. The pivoted flap or mirror carrier therefore, serves three purposes, namely, it is a cover for an opening in the top of the camera, a flap shutter and a support for the mirror when used with the focusing screen, and each of these functions is valuable in connection with a collapsible or foldable camera.

I claim as my invention:

1. In a folding camera, the combination with an exposure chamber provided with an opening and a support for the recording devices arranged at one side of the chamber, of a flap mounted to swing within the chamber and movable either into coöperation with the opening or to a position substantially parallel with the support and a front movable within the chamber through the path of movement of the flap.

2. The combination with a folding camera having an exposure chamber provided with an opening, of a flap mounted to swing within the chamber and movable either into coöperation with the opening or to a position substantially parallel with an adjacent wall of the chamber and a front movable within the chamber toward and from said wall and through the path of movement of the flap.

3. In a folding camera the combination with an exposure chamber, having bottom, side and rear walls, of a frame movable toward and from the rear wall of the chamber to form an opening at the top of the latter, a front connected to the frame and a flap mounted to swing within the chamber, and movable either into coöperation with the opening or to a position substantially parallel with the rear wall of the chamber.

4. In a folding camera, the combination with an exposure chamber having bottom, side and rear walls, of a frame movable toward and from the rear wall of the chamber to form an opening at the top of the latter, a front connected to the frame and a flap mounted to swing within the chamber when extending partially within the frame and movable either into coöperation with the opening or to a position substantially parallel with the rear wall of the chamber.

5. In a folding camera, the combination with an exposure chamber having bottom, side and rear walls, of a frame movable toward and from the rear wall of the chamber to form an opening at the top of the latter, a front connected to the frame, a focusing mirror mounted to swing within the chamber and movable either into substantial coöperation with the opening therein or to a position substantially parallel with its rear wall and means on the frame for retaining the flap in operative position relatively to the opening.

6. In a folding camera, the combination with an exposure chamber and a support for the recording devices at the rear thereof, of a frame movable toward and from the support, a front connected thereto, a flap controlling the passage of light between the frame and support mounted to swing within the chamber and movable rearwardly into substantial parallelism with the support through rearward movement of the frame, and means for arresting the movement of the flap when released from such parallel position by a forward movement of the frame to prevent light entering through the latter from gaining access to recording devices arranged on the support.

7. In a folding camera, the combination with an exposure chamber and a support for the recording devices at the rear thereof, of a frame movable toward and from the support to form an opening at the top of the chamber, a front connected to the frame, a flap mounted to swing within the chamber and movable into either substantial coöperation with the opening in the latter or to a substantial parallel position relatively to the support and means for arresting the movement of the flap at a point intermediate its said positions when released from the latter one, to prevent light entering through the frame from gaining access to the latter.

8. In a folding camera, the combination with an exposure chamber, a support for the recording devices at one side thereof and a flap mounted to swing within the chamber and movable toward the support to an inoperative position, of a frame movable toward and from the latter and a catch carried thereby and engaging the flap when the latter is released from its said inoperative position.

9. In a folding camera, the combination with an exposure chamber, a support for the recording devices at one side thereof and a flap mounted to swing within the chamber and movable toward the support to an inoperative position, of a frame movable toward and from the latter, a catch carried thereby and engaging the flap when the latter is released from its said inoperative position, and operating to move the flap in the direction of the support simultaneously with the rearward movement of the frame.

10. In a folding camera, the combination with an exposure chamber and a support for the recording devices arranged at one side thereof, of a frame movable toward and from the support a front connected therewith and a flap mounted to swing within the chamber toward the support and coöperating with the frame to prevent light entering through the latter from gaining access to recording devices arranged in the support.

11. In a folding camera, the combination with an exposing chamber having a forward opening and a support for recording devices arranged within the chamber, of a flap controlling the passage of light admitted through the opening and flexible light shields fastened to the lateral edges of the flap and connected upon the interior of the chamber.

12. In a camera, the combination with a casing provided with a forward opening and a front movable relatively thereto, of a focusing mirror arranged within the casing and movable rearwardly from its operative position relatively to the opening, a frame coöperating with the opening and movable within the body toward the mirror and a bellows connecting the front and frame.

13. In a camera, the combination with a casing provided with a forward opening and a front movable relatively thereto, of a swinging frame movable to a vertical position within the casing and coöperating with the opening when forwardly inclined and a bellows connecting the front and frame.

14. In a camera, the combination with a casing provided with an opening and a front movable relatively thereto, of a swinging frame movable to a vertical position within the casing and coöperating with the opening when forwardly inclined, a bellows connecting the front and frame and a flap pivotally mounted in the casing and extending within the frame when moved between its operative and inoperative positions.

15. In a camera, the combination with a casing provided with an opening and a front movable relatively thereto, of a frame arranged in the casing having an extension thereon projecting toward the opening and hinged to the casing, said frame coöperating with the opening when in an inclined position, and a bellows connecting the front and frame.

16. In a camera, the combination with a casing provided with an opening and with an inclined seat adjacent thereto and a front movable relatively to the casing, of a swinging frame arranged within the latter and coöperating with the opening by engagement with the seat when in inclined position and a bellows connecting the front and the frame.

17. In a camera, the combination with a casing provided with an opening and a front movable relatively thereto, of a frame arranged in the casing having an extension thereon projecting toward the opening and hinged to the casing, said frame coöperating with the opening when in an inclined position, a tension member arranged between the casing and frame normally operating to move the latter toward the opening and a bellows connecting the front and frame.

18. In a camera, the combination with a casing provided with an opening and a front movable relatively thereto, of a frame coöperating with the opening and movable within the casing, a bellows connecting the front and frame, a yielding plate on the latter and a flap pivoted within the body and engaging the plate when rotated to operative position.

19. In a camera, the combination with a casing, of a focusing mirror pivotally mounted therein and movable to operative and inoperative positions and a yielding resilient light excluding plate arranged within the casing tangentially to the path of the mirror and flexed by the latter when rotated to one of said positions.

20. In a camera, the combination with a casing having a forward opening and a rearward shutter opening and provided with a roll chamber, of a curtain shutter controlling the shutter opening and fed from the roll chamber, a frame movable within the casing and coöperating with the forward opening, a front movable relatively to the casing, bellows connecting the front and frame and a flexible light shield connected to the frame and to the casing and extending over the roll chamber.

21. In a camera, the combination with a casing provided with an opening, of a focusing mirror pivoted therein and movable to operative and inoperative positions relatively to the opening and a flexible light shield fastened to the mirror and connected with the casing.

22. In a camera, the combination with a casing having an opening, a movable frame arranged within the casing to coöperate with the opening, a front movable relatively to the casing, and a bellows connecting the front and frame, of a light excluding device arranged between the frame and casing comprising double walls on one of said members and a blade carried by the other fitting between the walls and movable relatively thereto.

23. In a camera, the combination with a casing provided with an opening, of a double hinge secured thereto, a bed carried by one of its movable parts, a frame carried by the other and coöperating with the opening, a front mounted on the bed and a bellows connecting the front and frame.

24. In a camera, the combination with a casing having an opening therein, a front movable relatively thereto, a focusing mirror mounted within the casing and movable to operative and inoperative positions, a movable frame arranged within the casing and coöperating with the opening and a bellows connecting the front and frame, of a latch carried by the frame and coöperating with the mirror to retain the latter in operative position.

25. In a camera, the combination with a casing provided with a forward opening, a front movable relatively thereto, a focusing mirror arranged within the casing and movable rearwardly from its operative position relatively to the opening, a frame coöperating with the opening and movable within the casing toward the mirror and a bellows connecting the frame and front, of a latch carried by the frame and engaging the mirror to retain it in operative position and to move it rearwardly when the frame is retracted from the opening.

26. In a camera, the combination with a casing provided with an opening, a movable member coöperating with the opening and a focusing mirror movable within the casing to operative and inoperative positions relatively to the opening, of a latch carried by the movable member and engaging the mirror to retain the latter in one of its positions.

27. In a camera, the combination with a casing having an opening, a movable member coöperating with the opening and a mirror mounted in the casing to move to operative and inoperative positions relatively to the opening, of a latch carried by the movable member and coöperating with the mirror to retain it in one of its positions and releasing devices carried by the casing and coöperating with the latch when the latter is in operative position.

28. In a camera, the combination with a casing having an opening, a movable member coöperating with the opening and a mirror mounted in the casing to move to operative and inoperative positions relatively to the opening, of a latch carried by the movable member and coöperating with the mirror to retain it in one of its positions, an actuating member mounted in the casing and engaging the latch when the latter is in operative position and an operating lever coöperating with the actuating member.

29. In a camera, the combination with a casing having an opening, a movable member coöperating with the opening and a mirror mounted in the casing to move to operative and inoperative positions relatively to the opening, of a latch carried by the movable member and coöperating with the mirror to retain it in one of its positions, a plunger mounted in the casing and coöperating with the latch when the latter is in operative position and a cam engaging the plunger and accessible for operation from the exterior of the casing.

30. In a camera, the combination with a casing having a rearward opening and a rearwardly extending bottom portion adjacent said opening, of a movable back coöperating with the opening and securing devices between the back and bottom portion comprising a longitudinally movable bar having an angular slot therein carried by one of the members and a projection on the other engaging within the slot, said bar being provided with a finger piece projecting beyond the edge of the member upon which it is mounted.

31. A camera having a cover and a focusing hood secured to the latter and provided with a flexible eyepiece projecting beyond said cover in the direction of its general extent when the latter is in open position.

32. A camera having a cover and a collapsible focusing hood secured to the latter, said hood being provided with an eyepiece formed integrally therewith, projecting beyond the cover in the direction of its general extent when the latter is in open position.

33. A camera having a cover and a focusing hood secured to the cover and composed of flexible material collapsible longitudinally and transversely and provided with an eyepiece formed integrally therewith, said eyepiece projecting beyond the cover in the direction of its general extent when the latter is in open position.

34. In a camera, the combination with a casing having a hinged cover, of a longitudinally and transversely collapsible focusing hood attached at one end to the casing and having one of its sides coextensive with and supported against the inner face of the cover during all its movements.

35. In a camera, the combination with a casing having a hinged cover provided with guides, of a longitudinally and transversely collapsible bellows connected at one end to the body and having one of its sides coextensive with and supported against the inner face of the cover and movable relatively thereto in the guides.

36. In a camera, the combination with a casing having a hinged cover, of a collapsible focusing hood secured to the body and a collapsible eyepiece on the hood projecting beyond the cover in the direction of general extent of the latter and foldable against the underside thereof.

37. In a camera, the combination with a body having a hinged cover, of a collapsible focusing hood secured to the body and a collapsible eyepiece on the hood projecting beyond the cover when open in the direction of its general extent and foldable against the underside thereof, said eyepiece being expanded automatically by the opening movement of the cover.

38. In a camera, the combination with a casing having a film chamber therein open at one side, of a film clip movable within the chamber and a spring finger carried thereon to engage and hold under tension a film roll arranged in the clip and operable as a handle accessible from the open side of the chamber for withdrawing the clip and film therefrom.

39. In a camera, the combination with a casing having a film chamber therein and a movable cover for the chamber of a film support arranged in the latter and a tension device adapted to engage a film roll mounted on the support and actuated to operative position by the closing of the cover.

40. In a camera, the combination with a casing having a film chamber therein and a movable cover for the chamber, of a film clip arranged in the latter, and a spring finger on the clip adapted to be held in engagement with a film roll mounted in the clip by engagement with the cover when the latter is closed.

41. In a camera, the combination with a casing provided with a film chamber, a movable cover therefor and film roll supports therein, of a film roll ejector arranged in the chamber and released through the raising of the cover.

42. In a camera, the combination with a casing provided with a film chamber, a movable cover therefor and a film roll support therein, of a film roll ejector comprising a resilient member arranged in the chamber to normally engage a film roll mounted on the support and held out of engagement therewith by the cover when the latter is in closed position.

43. In a camera, the combination with a casing provided with a film chamber, a movable cover therefor and film roll supports therein, of a resilient member arranged in the chamber and operating to eject a film roll therefrom and to project the cover from its closed position.

44. In a camera, the combination with a casing provided with a film chamber a movable cover therefor and film roll supports therein, of a leaf spring arranged in the chamber and adapted to engage a film spool mounted in the supports, said spring being provided with an arm engaged by the cover when the latter is in closed position.

45. In a folding camera, the combination with an exposure chamber having an opening therein, of a frame adapted to coöperate with the opening and movable toward and from the latter and a pivoted flap movable in the chamber and adapted to seat against the frame in a position to intersect at an angle rays of light admitted through the opening when said frame is in coöperative relation with the latter.

46. In a folding camera, the combination with an exposure chamber having an opening therein, a front movable relatively to the opening, a frame movable toward and from the opening and into coöperation therewith within the chamber and bellows connecting the front and frame, of a flap pivoted within the chamber and adapted to seat against the frame in a position to intersect at an angle rays of light admitted through the opening when the frame is in coöperative position relatively to the latter.

47. In a folding camera, the combination with an exposure chamber having an opening therein, a front movable relatively to the opening, a frame movable toward and from the opening and into coöperation therewith within the chamber and bellows connecting the front and frame, of a flap pivoted within the chamber to control the passage of light rays admitted through the opening, the front, frame and flap being movable into substantially parallel positions within the exposure chamber.

48. In a folding camera, the combination with an exposure chamber having an opening in its front wall and a frame movable within the chamber toward and from said opening and into coöperation therewith, of a flap pivoted within the chamber to move toward and from the rear wall thereof and control the passage of light rays admitted through the opening, said flap and frame being both movable to a position substantially parallel with the rear wall of the chamber.

49. In a folding camera, the combination with an exposure chamber having an opening therein, of a frame movable within the chamber relatively to the opening and into and out of coöperation therewith, a flap pivoted within the chamber to move toward and from the opening and arrested by the frame in a position to intercept at an angle rays of light admitted through the opening.

50. In a folding camera, the combination with a chamber having an opening in one wall thereof, of a frame movable within the chamber toward and from said wall to coöperate with the opening, and a flap pivoted within the chamber to move away from the opening to a position substantially parallel with the opposite wall.

51. In a folding camera, the combination with an exposure chamber having an opening therein, of a frame movable within the chamber into and out of coöperation with the opening, a front movable within the opening and a bellows connecting the front and frame.

52. In a folding camera, the combination with an exposure chamber having an opening in one wall thereof, of a frame movable within the chamber into and out of coöperation with the opening, a front movable through the opening and adapted to be housed between the frame and said wall and a bellows connecting the front and frame.

53. In a folding camera, the combination with an exposure chamber having an opening therein, of a frame movable within the chamber into and out of coöperation with the opening, a front movable within the opening, a bellows connecting the front and frame and a flap operating within the chamber.

54. In a folding camera, the combination with an exposure chamber having an opening therein, of a frame movable within the chamber into and out of coöperation with the opening, a bellows connecting the front and frame, and a swinging flap arranged in the chamber and movable to a position substantially parallel with the frame.

55. In a folding camera, the combination with an exposure chamber and a movable flap arranged therein, of a frame and a front connected with the frame, said frame and flap being movable to substantially parallel positions.

56. In a folding camera, the combination with an exposure chamber and a movable flap arranged therein, of a frame at one side of the chamber, a front and bellows connecting the front and frame, the front, frame and flap being movable to substantially parallel positions.

57. In a folding camera, the combination with a casing having a forward opening, of a member movable toward and from the opening within the casing, a front movable relatively to the opening and a bellows connecting the front and movable member and extending through the opening.

58. In a folding camera, the combination with a casing having front and rear walls and provided with an opening in its front wall, of a member movable within the casing toward and from the opening, a front movable relatively to the opening, a bellows connecting the front and movable member and extending through the opening and a flap movable within the casing and adapted to assume a folded position substantially parallel with the rear wall of the casing.

WILLIAM F. FOLMER.

Witnesses:
RUSSELL B. GRIFFITH,
H. H. SIMMS.